July 13, 1965 R. O. ROBISON 3,193,954
LEVEL INDICATOR FOR AN ELECTRIC IRON
Filed May 29, 1963 2 Sheets-Sheet 1
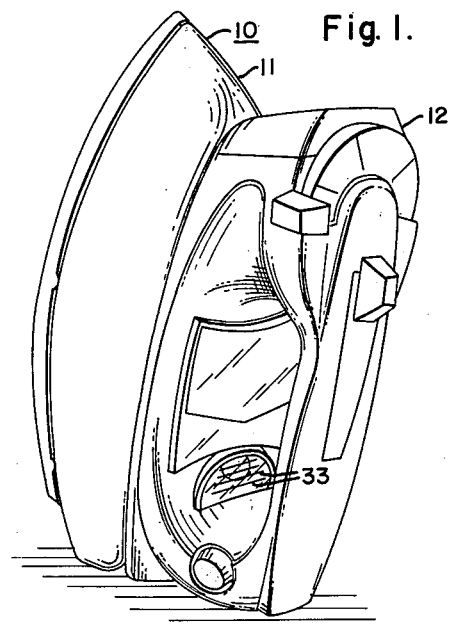
Fig. 1.
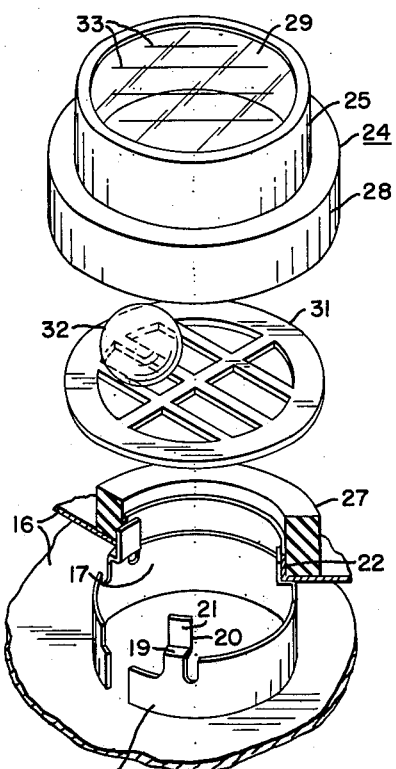
Fig. 4.
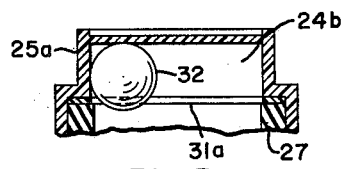
Fig. 6.
Fig. 5.
WITNESSES:
John L. Chopp
James F. Young
INVENTOR
Russell O. Robison
BY
Aubrey C. Brine July 13, 1965 R. O. ROBISON 3,193,954
LEVEL INDICATOR FOR AN ELECTRIC IRON
Filed May 29, 1963 2 Sheets-Sheet 2

United States Patent Office 3,193,954
Patented July 13, 1965

3,193,954
LEVEL INDICATOR FOR AN ELECTRIC IRON
Russell O. Robison, New Haven Township, Huron County, Plymouth, Ohio, assignor to Westinghouse Electric Corporation, Pittsburgh, Pa., a corporation of Pennsylvania
Filed May 29, 1963, Ser. No. 284,234
2 Claims. (Cl. 38—77)

This invention relates to electric steam irons and more particularly to a liquid level indicator for use in a steam or spray iron.

In steam or spray irons having a self-contained liquid reservoir, it is common practice to locate the reservoir where it is not readily viewable by the user. In these devices, without the aid of an indicator of some sort, it is necessary that the user guess as to when the reservoir needs refilling, or wait until the iron ceases to spray or emit steam.

Heretofore, various means have been disclosed which serve to indicate the liquid level in a steam or spray iron. However, such means have generally required a careful examination of the indicator to determine a low liquid level in the reservoir. These devices have, on the most part, proved unsatisfactory to the busy housewife who desires an instant warning of a low liquid level in the reservoir, without the necessity of interrupting the normal ironing routine to check such an indicator device.

It is, therefore, an object of the invention to provide a rapid indication of the liquid level in an electric iron of the steam or spray type.

Another object of the invention is to provide a steam or spray iron having a liquid level indicator which is simple and trouble free in operation.

A further object of the invention is to provide a liquid level indicator which is simple to manufacture and easily incorporated in a steam or spray iron.

These objects of the invention, and other objects which will become apparent as the description proceeds, are achieved by providing a chamber having a translucent wall adjacent the shell structure of the iron and having an opening into the reservoir. Within the chamber there is provided a brightly colored float member which is readily discernible through the chamber wall. The chamber is so located that when the iron is in a resting position, the location of the float member in the chamber is a rapid indication of the liquid level in the reservoir.

For a better understanding of the invention, reference should be had to the accompanying drawings, wherein:

FIGURE 1 is a perspective view showing an electric steam iron constructed and arranged in accordance with the present invention;

FIG. 4 is an exploded view showing details of various elements employed in the embodiment of the invention;

FIG. 5 is a sectional view similar to a portion of FIG. 3 showing an alternate embodiment of the invention; and FIG. 6 is a perspective view showing details of the alternate embodiment of FIG. 5.

While the invention is broadly applicable to electric irons having a liquid storage reservoir contained therein, the invention has been herein illustrated as employed in an electric steam iron and will be so described.

Figure 2:
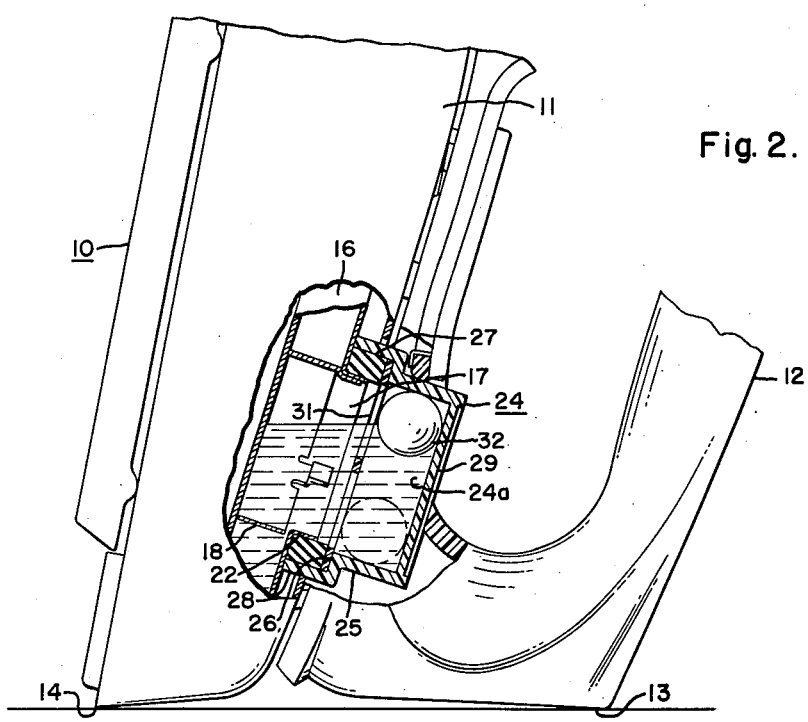
FIG. 2 is a fragmentary sectional view of the iron taken on a larger scale, showing details of the invention.

Referring to the drawings, especially FIGS. 1 and 2, there is shown an electric steam iron 10 having a shell structure 11 and a handle member 12 disposed on the shell structure. In addition to providing a means for grasping the iron 10, the handle member 12 has a substantially flat rear surface 13 which cooperates with an edge 14 of the shell structure 11 to provide a resting means for the iron when positioned as shown in FIGS. 1 and 2.

It should here be noted that the shell structure 11 and the handle member 12 serve as a housing for the various elements comprising the heating and steam producing system of the iron. As there are many such heating and steaming devices well known in the art, and as they form no part of the present invention, they have not been illustrated or described herein. For the sake of clearness and brevity, only those elements within the shell structure 11 and forming part of the present invention have been shown.

Figure 3:
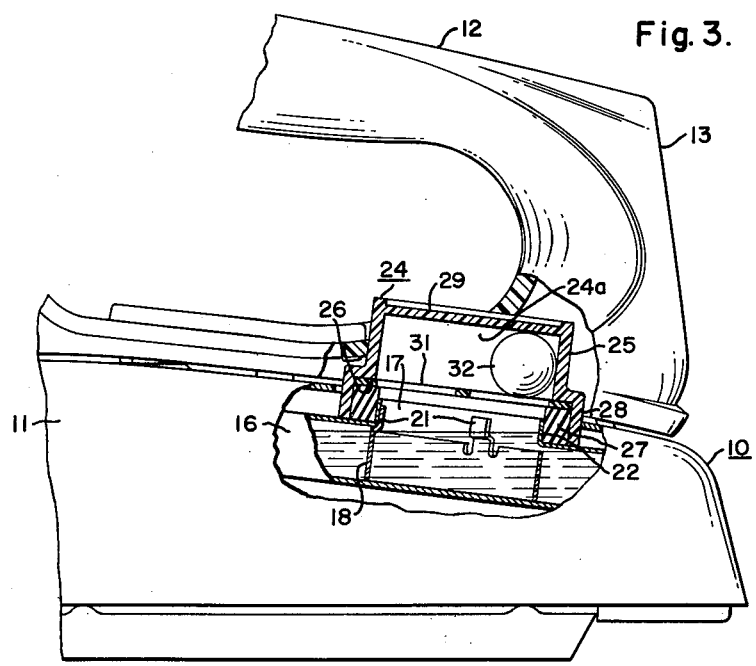
FIG. 3 is a fragmentary sectional view similar to FIG. 2 but showing details of the invention with the iron in a second position.

Referring now to FIGS. 2 and 3, there is shown a reservoir 16, housed within the shell structure 11, for containing liquid to be used for steam or spray ironing. The reservoir 16, which is concealed from the user by the shell structure 11, may be of any size or shape which the available space in the shell structure permits.

While in the embodiment shown, the liquid would generally be distilled or tap water, in a spray iron, for which the invention is equally applicable, the liquid may also be a starch solution or any suitable cloth treating mixture.

Referring to FIGS. 2 and 3, it will be observed that the reservoir 16 has a circular opening 17 through its top wall near the rear thereof.

An annular spacer member 18 is disposed between the top and bottom walls of the reservoir 16 for supporting the reservoir top wall adjacent the opening 17. This spacer is of greater diameter than the opening 17 (FIG. 4) so that the reservoir top wall rests on the shoulders 19 of L-shaped tabs 20 whose free terminal portions 21 are closedly received within the upwardly-extending flange 22 at the periphery of the opening 17.

A closure member 24, having a side wall 25 stepped, as at 26, covers the opening 17 in the top wall of the reservoir, and defines a chamber 24a. An annular gasket 27 of resilient material provides a liquid-tight seal between a lower portion 28 of the closure side wall 25 and the reservoir opening flange 22.

The closure member 24 has a transparent or translucent top wall 29. A perforated separator or screen 31 of disc-like form is clamped between the step 26 of the closure side wall 25 and the top of the gasket 27 and retains in the upper portion of the chamber 24a a spherical float 32. With the closure 24 in place, as in FIGS. 2 and 3, the tubular wall 28 receives the gasket 27 in interference fit, thereby holding the assembly in place. It will be apparent that instead of, or in addition to, the interference fit, an adhesive or cement may be used to secure the parts assembled. Also, engagement of the edge of the handle cutout may contact the top of the closure 24 to hold the parts assembled. The translucent wall 29 may have a plurality of graduating marks 33 inscribed thereon, the function of which will be apparent from the following description.

When the iron is in use, the reservoir 16 and the chamber 24a are oriented as shown in FIG. 3, with the chamber free of liquid and the float member 32 retained in the chamber by the separator screen 31. When so positioned, the iron 10 functions in the usual manner, with the user unable to determine the quantity of liquid remaining in the reservoir.

However, as best shown in FIG. 2, when the iron is moved to upended resting position, liquid in the reservoir enters the chamber 24a. Should the liquid level be as shown in FIG. 2, or higher, the float appears adjacent the translucent wall 29 when viewed by the user. Each time the user positions the iron 10 on end (which is frequently done during the ironing process), the appearance of the float member 32 serves as a rapid indication of the liquid level in the reservoir 16. When the water in the reservoir is nearly gone, the level falls below that shown in FIG. 2, and the float member 32 moves down to a position shown by dotted lines in FIG. 2. It should be noted that a portion of the handle 12 serves to obscure a segment of the translucent wall 29 from the user. With the float member 32 located as shown by the dotted lines of FIG. 2, the member is also obscured from the view of the user, which serves as a rapid indication that the liquid level has reached a danger point and the iron needs refilling.

The graduating marks 33 may be so aligned and spaced as to indicate the amount of liquid remaining in the reservoir 16 or the amount of steaming time remaining before the reservoir needs to be refilled.

The spherical float member 32 may be fabricated of any material having a lesser density than the liquid being used. However, the member is preferably of a bright color, or a color offering a marked contrast to the surrounding portion of the handle 12. By employing a brightly colored float member 32, the wall 29, which may be transparent, is preferably of a translucent material having a fogged appearance. With such an arrangement, should the wall 29 become coated with mineral deposits, or other impurities from the liquid being used, neither the appearance nor the function of the translucent wall will be harmed.

Referring now to FIGS. 5 and 6, there is shown an alternate embodiment of the invention wherein separator screen 31 of the prior embodiment is replaced by screen 31a and chamber 24a is replaced by the chamber 24b. It will be noted that the screen 31a has a single slotted opening 35 which permits the liquid to enter the chamber 24b and also serves as a guide to restrict the movement of the float member 32. To further retain the float member 32 in the slot 35, the chamber 24b has a tubular wall 25a which is smaller in height than the wall 25 of the chamber 24a. It should therefore be apparent from FIG. 5, that the float member 32 is restricted to linear movement along the slot 35 when the chamber 24b and screen member 32a are assembled as in the previous embodiment.

With the alternate embodiment of the invention positioned on the reservoir, the float member 32 will again move from the position shown in solid lines to the dotted line position as shown in FIG. 2. However, the float member 32 is now restricted to linear movement and remains centrally located in the chamber 24b. With this arrangement, the user is provided with the added advantage of having the float member 32 equally visible from either side of the iron, thereby insuring a rapid indication of the liquid level as viewed from any position.

From the foregoing, it should be obvious that the invention provides a rapid indication of the liquid level in the reservoir of an electric iron of the steam or spray type. Further, such rapid indication is achieved by providing a liquid level indicator which is trouble free in operation and which may be easily incorporated in an electric steam or spray iron.

While the invention has been described with reference to but two embodiments thereof, it will be apparent to those skilled in the art that it is not so limited, but is susceptible of various other changes and modifications without departing from the spirit thereof.

What is claimed is:

1. An electric iron comprising,
   a reservoir for containing liquid,
   shell structure defining a housing for said reservoir and concealing said reservoir from the user,
   means for resting the iron in an upended position with a rear portion of said reservoir downwardly disposed,
   means defining a chamber disposed adjacent said shell structure and having an opening into said rear portion of said reservoir,
   a translucent wall in said chamber having a plurality of graduating marks inscribed and aligned thereon,
   said translucent wall being disposed at an acute angle to the vertical with the iron positioned on said resting means,
   a float member in said chamber, and
   a separator screen disposed in said opening between said chamber and said portion of said reservoir for maintaining said float member in said chamber,
   whereby the location of said float means relative to said graduating marks, as viewed through said translucent wall with the iron positioned on said resting means, provides a rapid indication of the liquid level in said reservoir.

2. The structure in claim 1 wherein said separator screen has means for restricting said float member to linear movement along the line of said graduating marks.

References Cited by the Examiner

UNITED STATES PATENTS

| | | | |
|---|---|---|---|
| 1,063,604 | 6/13 | Scalley | 73—330 |
| 2,345,889 | 4/44 | Talbot | 73—331 |
| 2,825,986 | 3/58 | Pavlic | 38—77 |
| 3,075,309 | 6/63 | Seyfried et al. | 38—77 |

FOREIGN PATENTS 828,013  1/52  Germany.

JORDAN FRANKLIN, *Primary Examiner.*